Jan. 27, 1970    D. C. GRIEB    3,491,808
RETRACTABLE SAW GUARD AND SPRING CONSTRUCTION THEREFOR
Filed Jan. 22, 1968
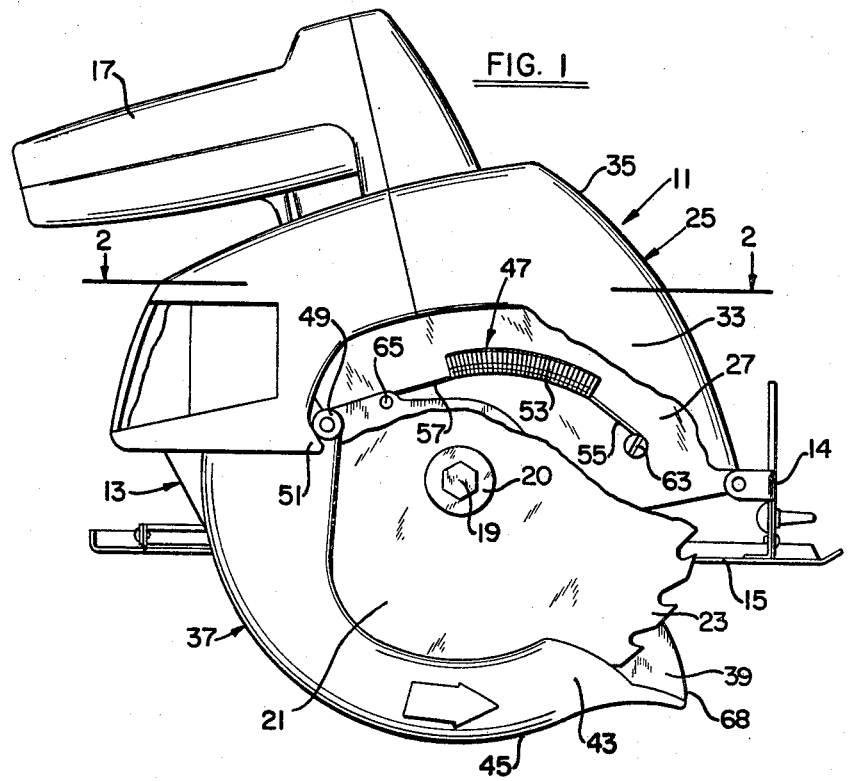
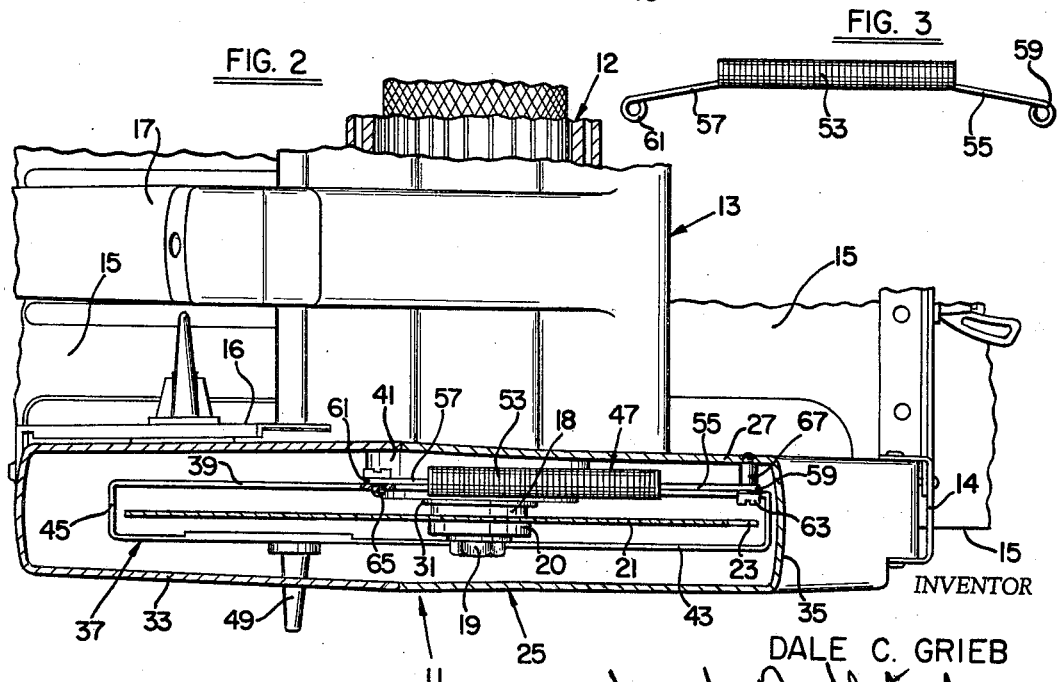
INVENTOR
DALE C. GRIEB
BY Joseph R. Slotnick
ATTORNEY United States Patent Office 3,491,808
Patented Jan. 27, 1970

3,491,808
RETRACTABLE SAW GUARD AND SPRING
CONSTRUCTION THEREFOR
Dale C. Grieb, Towson, Md., assignor to The Black and
Decker Manufacturing Company, Towson, Md., a corporation of Maryland
Filed Jan. 22, 1968, Ser. No. 699,676
Int. Cl. B27g 19/04
U.S. Cl. 143—159                3 Claims

ABSTRACT OF THE DISCLOSURE

The device disclosed herein includes a housing adapted to have an electric motor supported thereon. A rotary saw blade is adapted to be driven by the motor and is protected by a two part guard, one part of which is stationary while the other part is resiliently biased and movable to facilitate travel of the saw along a workpiece during cutting. In addition, handle means is provided on the housing for control and manipulation and a support plate on the housing supports the tool and allows it to move over the workpiece during use.

BRIEF SUMMARY OF THE INVENTION

The novel construction here relates specifically to an improved blade guard assembly for a portable rotary saw and includes an upper, stationary guard and a lower, movable guard adapted to pivot substantially about the rotational axis of the saw blade as the saw blade moves along the workpiece. The movable guard is normally biased toward a first or guarding position by a flexible member but is retractable against the force of the member through contact with the workpiece during sawing. The construction and arrangement of this flexible member and its interrelation with the guard components, is such as to provide long life and optimum reliability and performance thereof while minimizing the overall size and cost of the saw.

Main objects, therefore, of the present invention are to provide an improved blade guard construction for portable, power operated, rotary saws, which construction embodies a housing, a stationary guard, and a movable guard normally biased by a flexible member toward a guarding position, wherein the flexible member, the movable guard and the stationary components are constructed and interrelated in a manner adapted to provide long life of the flexible member and to reduce the overall size and complexity of the tool.

Further important objects of the present invention are to provide an improved construction of the above character which is readily assembled and disassembled and thereby facilitates easy part replacement, and which provides a relatively constant biasing force on the movable guard throughout all phases of operation.

Additional objects of the present invention are to provide an improved construction of the above character which is relatively inexpensive to manufacture, rugged in construction and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a portable, power operated, rotary saw embodying a preferred form of the present invention and shown with the saw blade partly broken away for clarity;

FIG. 2 is an enlarged, sectional view of a portion of FIG. 1 taken along the line 2—2 thereof; and FIG. 3 is a view of the blade guard return spring, illustrated in FIGS. 1 and 2, but showing the spring in its unstressed position.

BROAD STATEMENT OF THE INVENTION

Broadly described, the present invention relates to a portable, power operated rotary saw of the type having a housing, a motor carried by said housing, a saw blade supported upon said housing for rotation about a central axis, blade guard means adapted to protect at least a portion of the cutting edge of said blade, said guard means including an upper guard fixed relative to said housing and enveloping the blade edge along generally the upper half of said blade, a lower guard supported for pivotal movement about said central axis and adapted to telescope arcuately relative to said upper guard, said lower guard being pivotally movable from a first position, where it envelopes the blade edge along generally the lower half of said blade, to a second position where the blade edge along generally the lower half of said blade is exposed, and means normally biasing said lower guard toward said first position; the improvement wherein said biasing means includes elongated spring means interconnected at opposite ends to points on said upper and lower guards, said spring means being located wholly above said axis for all pivotal positions of said lower guard, said points being situated such that the distance therebetween diminishes as said lower guard moves from said first to said second position.

DETAILED DESCRIPTION

Referring now more specifically to the drawings, a rotary saw embodying the present invention is illustrated generally at 11 in FIGS. 1 and 2 and is seen to include a housing 13 having an electric motor 12 secured and supported therein in a a suitable manner. The housing 13 also has a supporting base plate assembly 15 fixed thereto by brackets 14, 16 and a control and manipulating handle 17 secured thereto in a suitable manner. The motor 12 has an output shaft (not shown) drivingly interconnected with a blade shaft 18 through a transmission (not shown). A rotary saw blade 21 is secured to the shaft 18 by a screw 19 and a clamping washer 20 and the outer peripheral edge of the saw blade 21 is provided with cutting teeth 23 adapted, when the motor is energized, to cut a workpiece.

It is customary to provide a guard assembly on these tools for the saw blade to both protect the operator from inadvertently or accidentally injuring himself as well as to prevent the saw blade from damaging anything when the tool is not in use. These guard assemblies customarily include a stationary guard and a movable guard, the latter being movable or retractable from its normal position to expose a portion of the blade so that it can pass through and along a workpiece during cutting. In general, the movable guard is normally biased, by a spring or other means, toward a position where it provides maximum blade protection. Desirably, the movable guard is supported for pivotal movement about the axis of the blade shaft from its extended or blade protecting position to its retracted or blade exposing position where it telescopes at least partly into the fixed guard.

In a number of commercially successful versions, a tension-type spring is connected at one end to the fixed guard and at its other end to the movable guard to normally bias the movable guard toward the protecting position. However, as will become more apparent later, this necessitated the use of a relatively long spring and, in order to provide the necessary spring characteristics as well as an acceptable range of spring biasing force throughout the various stages of guard movement, the spring wire diameter necessarily had to be relatively small. As a result these springs have been subject to relatively frequent failures which is, of course, undesirable. In the present invention, this situation is alleviated by employing a different type spring and spring action which results in an entirely different loading condition thereon. This, in turn, makes possible the use of a heavier guage wire in the spring which, of course, greatly reduces the frequency of failure.

Thus, as seen in FIG. 1, the saw 11 includes an upper, stationary guard 25 integral with or otherwise suitably fixed to the housing 13. This guard 25 has an inner wall 27 terminating in a hub (not shown) adapted to support and carry a bearing 31 for the blade shaft 19. An outer wall 33 is connected to and spaced from the inner wall 27 by a bridging portion 35 and the upper guard 25 envelops the cutting edge along substantially the upper half of the saw blade 21.

A lower, movable guard 37 has an inner wall 39 disposed adjacent the wall 27 of the guard 25 and which includes a hub 41 supported on the bearing 31. The movable guard 37 has an outer wall 43 interconnected with and spaced from the inner wall 39 by a bridging portion 45 and the lower guard 37 envelops the blade cutting edge along most of the lower half of the saw blade 21.

As shown in FIG. 1, where the lower guard 37 is in its normal, blade protecting position, the leading portion of the saw blade 21 adjacent the forward end of the base plate assembly 15 is exposed. The rearward end of the lower guard 37 is disposed within the upper guard 25. In fact, the lower guard 37 is adapted to swing in a clockwise direction about the axis of the blade shaft 18 and pivotally telescope within the upper guard 25 as the saw blade 21 is moved along a workpiece during cutting thereof. As the lower guard 37 so telescopes within the upper guard 25, more of the lower part of the saw blade 21 is exposed and, as will be appreciated, the saw blade 21 can travel along the workpiece being cut.

As described, the lower guard 37 is normally held in the position shown in FIG. 1 but is adapted to swing or pivot in a clockwise direction about the axis of the blade shaft 18. A return spring 47 is interconnected between the upper guard 25 and the lower guard 37 and normally biases the latter toward the position shown in FIG. 1 where a bumper pin 49 thereon engages a projecting lip 51 on the former. As shown in FIG. 2, the spring 47 is disposed wholly above the axis of the saw blade 21 and comprises an intermediate section including a plurality of closely disposed coils 53. A projecting arm or tang 55, 57 extends outwardly from each end of the coils 53 and each tang 55, 57 has a terminal loop 59, 61 which fits loosely around screws 63, 65 secured to the upper and lower guards 25, 27, respectively. This loose connection of the loops 59, 61 permits them to pivot freely on the screws 63, 65 as will be described. A spacer sleeve 67 is disposed on the screw 63 between the spring loop 59 and the upper guard wall 27 so that the spring 47 does not rub against the upper guard wall 27. However, since the spring 47 is wholly above the lower guard 37 and remains so during all phases of operation, no spacer is needed between the loop 61 and the lower guard wall 39.

At rest, as shown in FIG. 3, the spring 47 assumes a shape such as is generally indicated in FIG. 3. When assembled to the guards 25, 37, the spring 47 is bent or flexed from the FIG. 3 position and laterally relative to the axis of the shaft 18, and preferably away from the shaft 18, and exerts a biasing force on the lower guard 37 tending to move it in a counterclockwise direction about the motor shaft 19 and holds the pin 49 against the lip 51. When the saw 11 is used to make a cut in a workpiece, the leading edge of the workpiece bears against a mouth portion 68 of the lower guard 37 and the latter is pivoted in the clockwise direction about the axis of the blade shaft 18. When this occurs, the loops 59, 61 pivot on the screws 63, 65 and the distance between the spring terminal loops 59, 61 diminishes. Thus, the spring 47 is deflected laterally away from the shaft 18 or "bowed"; however, the nature of this spring 47 is such that during this "bowing" or bending, there is virtually no tension thereon and the biasing force on the lower guard 37 remains substantially constant throughout all stages of pivotal movement of the lower guard 37 relative to the upper guard 25. In addition, since there is no appreicable spring tension, there is no resulting stress build-up in the spring 47 through pivotal movement of the lower guard 37 so that the problem of spring failure is virtually eliminated.

Another and related advantageous feature of this construction becomes apparent when comparing it with many prior art tension spring arrangements. There, in order to provide the desired biasing action on the lower guard and prevent the spring from obstructing saw advance along the workpiece in these devices, it is necessary that the spring have one end attached to the rear portion of the upper guard and its other end to an upper point on the lower guard, with the intermediate part of the spring extending partly around the hub for the blade shaft. The nature of this type of tension spring construction is such that it requires a relatively small diameter wire (approximately 0.020 inch, since a heavier guage wire provides too much resistance to pivotal action of the guard, and this small wire guard often resulted in premature spring failure. However, with the present invention, a wire diameter of approximately 0.051 inch replaces the smaller wire diameter spring, disclosed above. This heavier wire guage, together with the fact that the flexure or bending loaded spring of the present invention experiences considerably less stress build-up during flexing than does a tension spring, considerably reduces the frequency of spring failure in these tools.

By the foregoing, there has been disclosed an improved retractable saw guard and spring construction therefor calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a portable, power operated, rotary saw of the type having a housing, a motor carried by said housing, a saw blade supported upon said housing for rotation about a central axis, blade guard means adapted to protect at least a portion of the cutting edge of said blade, said guard means including an upper guard fixed relative to said housing and enveloping the blade edge along generally the upper half of said blade, a lower guard supported for pivotal movement about said central axis and adapted to telescope arcuately relative to said upper guard, said lower guard being pivotally movable from a first position, where it envelops the blade edge along generally the lower half of said blade, to a second position where the blade edge along generally the lower half of said blade is exposed, and means normally biasing said lower guard toward said first position; the improvement wherein said biasing means includes elongated spring means interconnected at opposite ends to points on said upper and lower guards, said spring means being located wholly above said axis for all pivotal positions of said lower guard, said points being situated such that the distance therebetween diminishes as said lower guard moves from said first to said second position.

2. In a device as defined in claim 1, said spring means comprising a coil spring having tang portions at either end which are connected to said movable and fixed guard means, respectively.

3. In a device as defined in claim 2 wherein said coil spring is flexed in a direction generally normal thereto.

References Cited

UNITED STATES PATENTS

| | | | |
|---|---|---|---|
| 1,740,074 | 12/1929 | Crowe | 143—159 X |
| 2,488,947 | 11/1949 | Vavrik | 143—159 X |
| 2,543,486 | 2/1951 | Briskin | 143—159 X |

DONALD R. SCHRAN, Primary Examiner